United States Patent

Hernqvist

[15] 3,683,295
[45] Aug. 8, 1972

[54] GAS LASER DISCHARGE TUBE
[72] Inventor: Karl Gerhard Hernqvist, Princeton, N.J.
[73] Assignee: RCA Corporation
[22] Filed: May 8, 1970
[21] Appl. No.: 35,692

[52] U.S. Cl.................................................331/94.5
[51] Int. Cl.................................................H01s 3/00
[58] Field of Search......................................331/94.5

[56] References Cited

UNITED STATES PATENTS 3,531,734  9/1970  Gordon et al..............331/94.5
3,464,028  8/1969  Moeller......................331/94.5

OTHER PUBLICATIONS

" Metal Vapor Goes Commercial," Electronics; Aug. 4, 1969, Vol. 142, No. 6.
" Gas Pumping in Continuously Operated Ion Lasers," Bell System Technical Journal; Vol. XLIII, No. 4.

Primary Examiner—Ronald L. Wibert
Assistant Examiner—Conrad Clark
Attorney—Edward J. Norton

[57] ABSTRACT

In a gas laser discharge tube, such as a He-Cd laser discharge tube, where the active lasing gas is cataphoretically transported from the anode region toward the cathode region during the occurrence of a discharge, a diffusion return path is provided between the cathode region and the anode region. The return path has conductive means located therein to prevent a discharge within the return path, but still permit the diffusion of gas therethrough. In the case where the cataphoretically transported gas is a metal vapor, a density control heater may be placed in the vicinity of the cathode to maintain the density of metal vapor molecules in the cathode vicinity at that value which results in a minimum amount of unwanted noise being generated.

14 Claims, 2 Drawing Figures

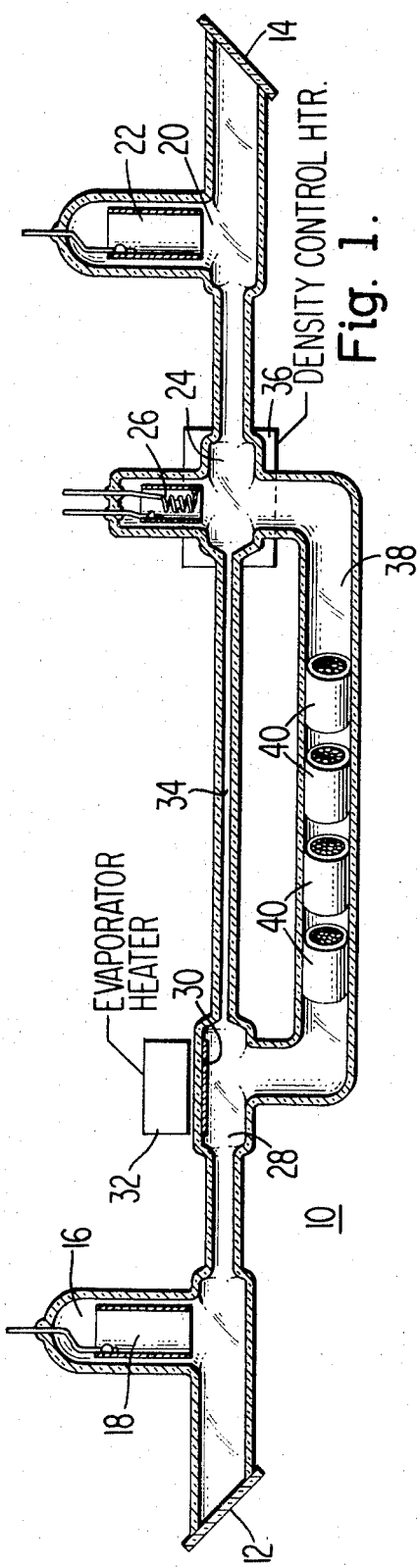
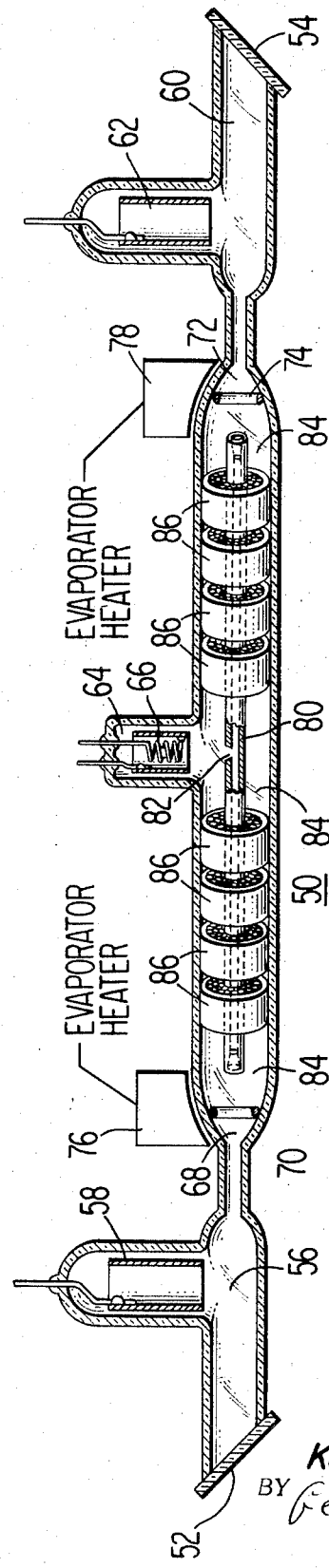
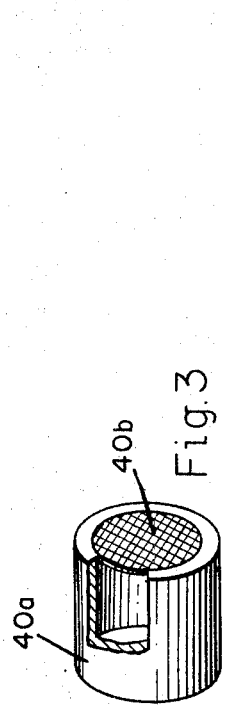
INVENTOR.
Karl G. Hernqvist
BY George J. Seligsohn
ATTORNEY

GAS LASER DISCHARGE TUBE

This invention relates to gas laser tubes using cataphoretic transport of the active gas, which may be a metal vapor such as cadmium, from the anode region toward the cathode region of the tube, and, more particularly, to such a tube where one or more problems associated with cataphoretic transport of an active gas or vapor is overcome.

In gas laser discharge tubes employing as an active material a vapor, such as cadmium in a He—Cd tube, it is usual to provide the active material in solid form in the general vicinity of the tube anode, evaporate this solid material by means of a suitably placed evaporator heater situated on exterior of the tube, cataphoretically transport the vapor through the discharge bore to the vicinity of the tube cathode, and then condense it back to solid form in a relatively cool condenser.

Such an arrangement gives rise to at least two problems. First, the tube's life is limited by the time that it takes for the entire original deposit of the active material in solid form in the evaporator portion of the tube to be evaporated, cataphoretically transported to the condenser portion and condensed therein. Second, relatively high noise power output fluctuations, having peak to peak amplitudes up to 50 percent of the average DC output, occur at frequencies of the order of tens or hundreds of KHz. This high noise output is particularly undesirable.

It has been found that the first-mentioned problem may be overcome by getting rid of the condenser portion of the tube, and, instead, dividing the interior of the tube between the anode and cathode electrode into first and second separated regions which communicate with each other in the vicinity of the respective electrodes. The first region is made to provide a sufficiently unobstructed path between the anode and cathode electrodes to permit a discharge therebetween. However, conductive means are located within the second region to prevent a discharge within the second region between the anode and cathode electrodes, but still permit diffusion of gas between the electrodes through the second region. Thus, any gas cataphoretically transported from the anode to the cathode electrodes through the first region in response to a discharge therethrough will diffuse back from the cathode to the anode electrodes through the second region without the occurrence of an unwanted discharge in the second region.

It has been found that the second problem of high noise output is due to large random fluctuations in the density of active material molecules in the vicinity of the cathode region. This problem is made worse by the usual cooling of the condenser portion of the tube. By suitably heating the region of the tube in the vicinity of the cathode to an optimum temperature, the unwanted noise output, if it occurs, can be reduced by a very great extent.

It is, therefore, an object of the present invention to provide an improved gas laser discharge tube of the type in which at least a portion of the gas is cataphoretically transported from the anode electrode toward the cathode electrode in response to a discharge in the tube.

This and other objects, features and advantages of the present invention will become more apparent from the following detailed description taken together with the accompanying drawing in which:

FIG. 1 shows a first embodiment of the present invention, and

FIG. 2 shows a second embodiment of the present invention.

Referring now to FIG. 1, tube 10 is terminated at its left end by Brewster angle window 12 and terminated at its right end by Brewster angle window 14. In the vicinity of Brewster angle window 12 is anode region 16 housing main anode 18. In the vicinity of Brewster angle window 14 is anode region 20 housing auxiliary anode 22.

To the left of region 20 is cathode region 24 housing cathode 26. To the right of anode region 16 is evaporator region 28 housing active lasing material 30, such as cadmium, in solid form. Material 30 is placed in evaporator region 28 at the time the tube is manufactured. Evaporator heater 32, in cooperative relationship with evaporator region 28, heats material 30 by an amount sufficient to vaporize it.

Directly connecting evaporator region 28 and cathode region 24 is bore 34. Evaporator region 24 is heated in a manner to be described in detail below by density control heater 36.

Providing a return path between cathode region 24 and evaporation region 28 is diffusion portion 38. Longitudinally distributed over a significant portion of the length of diffusion portion 38 are a plurality of separate spaced, conductive grid elements 40. Each of the elements has a significant length dimension and is configured to divide the entire volume defined by the cross-section of the diffusion portion and the length of that element into a bundle of separate gas conduits, each conduit of which extends from one end to the other end of that element. The cross-sectional area of any single gas conduit of the bundle is sufficiently smaller than either the cross-section of the diffusion portion or the length of that conduit to prevent a discharge from taking place therethrough. Furthermore, the spacing between the plurality of elements or between either end grid element and the anode or cathode electrode, as the case may be, which is close thereto, is sufficiently small to prevent a discharge from taking place therebetween. More specifically, the number of conductive means is larger than $V_a/V_c$, where $V_a$ is the normally-applied discharge voltage, at which the tube operates and $V_c$ is the normal cold cathode drop which depends on the grid element material and gas in said tube.

The actual construction of the grid elements may take any of several forms. For instance, a grid element may consist of a bundle of thin-walled nickel tubings, tacked at the ends to a very thin tungsten grid mesh. Each grid element may be made about one-half inch long; the individual nickel tubing comprising each gas conduit may be 40 mils in outer diameter with a 2 mil wall. In this type of construction, only about 15 percent of the cross-sectional area of return diffusion portion 38 is blocked by any grid element. Another form that the grid element may take, by way of example, is a pair of interleafed rolled sheets of aluminum, one of which is smooth and the other one of which is crinkled, to provide a corrugated cylindrical structure. The cross-sectional area of return diffusion portion 38 is made much larger than the cross-sectional area of bore 34 (in the order of 100:1, for instance) in order to insure that the rate of diffusion of molecules of gas through portion 38 back from the cathode to the anode electrodes is at all times substantially equal to the rate at which molecules of gas are cataphoretically transported through bore 34 between the anode and cathode electrodes. A still other form each of the plurality of grid elements may take is a single relatively wide cylinder having a tight conductive mesh of high optical transparency at one or both ends thereof, such as shown in FIG. 3 where relatively wide cylinder 40a has one end thereof covered by tight conductive mesh 40b. Although not shown in FIG. 3, a tight conductive mesh, similar to mesh 40b, could cover the left end of cylinder 40a as well as the right end thereof.

The operation of the tube shown in FIG. 1 will now be described. The presence of main anode 18 in the vicinity of Brewster angle window 12 and the presence of auxiliary anode 22 in the vicinity of Brewster angle window 14 will cataphoretically prevent any of the cataphoretically transported gas from reaching either Brewster angle window 12 or Brewster angle window 14. However, vaporized material 30 present in evaporator region 28 will be cataphoretically transported toward cathode region 24 within the discharge which takes place in bore 34 due to an electric field, not shown, applied between main anode 18 and cathode 26.

The discharge taking place within bore 34 keeps the vaporized material 30 therein hot enough so that it does not condense. However, the cataphoretically transported material 30 which reaches relatively wide cathode portion 24 would, if it were not for density control heater 36, tend to cool, causing wide variations in the density of the number of molecules within cathode region 24 and, hence, fluctuations of the density of cataphoretically transported molecules in the discharge within bore 34. This, were it not for density control heater 36, would tend to provide unwanted noise fluctuations in the power output of the laser, which, as discussed above, may be 50 percent peak to peak with respect to the average DC output at frequencies in the tens or hundreds of KHz. It has been found, however, by heating cathode portion 24 to an appropriate temperature, such as 235° C in the case of a He—Cd laser tube, by means of density control heater 36, the peak to peak percentage of power output fluctuations with respect to the average DC output can be reduced from 50 percent to less than 5 percent. Thus, a laser with a much lower noise power in its light output can be obtained by heating cathode portion 24 to that particular temperature in which the density of cataphoretically transported vapor molecules remains substantially constant with respect to time throughout the entire discharge region within bore 34.

Vapor molecules are being pumped at a significant rate by cataphoretic transport, during the occurrence of discharge from evaporator region 28 to cathode region 24 through bore 34. This means that the cross-sectional area of diffusion return portion 38 must be sufficiently larger than the cross-sectional area of bore 34 to permit diffusion therethrough, which is passive, from cathode region 24 back to evaporator region 28 to occur at the same rate of molecules per second as the rate of cataphoretic transport, which is active, of molecules from evaporator portion 28 to cathode portion 24 through discharge tube 34. Furthermore, the presence of grid elements 40 is required in order to prevent unwanted discharge from taking place between anode 18 and cathode 26 in return diffusion portion 38.

Referring now to FIG. 2, laser tube 50 is terminated at the left by Brewster angle window 52 and is terminated at the right by Brewster angle window 54. In the vicinity of Brewster angle window 52 is anode region 56 in which is located left-hand anode 58. In the vicinity of Brewster angle 54 is anode region 60 in which is located right-hand anode 62.

Intermediate anode regions 56 and 60 is cathode region 64 in which is located cathode 66. Between anode 58 and cathode 66, in the vicinity of anode region 56, is located evaporator section 68 in which is deposited active material 70 in solid form. Similarly, between cathode region 64 and anode region 60, in the vicinity of anode region 60, is located evaporator section 72 in which is deposited active material 74 in solid form. Evaporator heater 70 is situated in cooperative relationship with evaporator section 68 to vaporize material 70 and evaporator heater 78 is situated in cooperative relationship with evaporator section 72 to vaporize material 74.

Centrally located longitudinal bore 80 extends from evaporator section 68 to evaporator section 72. Further, bore 80 has an opening 82 in the wall thereof in vicinity of cathode region 64.

Bore 80 is coaxially disposed in spaced relationship with respect to the inner wall of the envelope of tube 50 extending from evaporator section 68 to evaporator section 72, as shown. The annular region defined by the outer wall of bore 80 and the spaced surrounding inner wall of the envelope of tube 50 defines return diffusion portion 84 of tube 50.

A plurality of longitudinally spaced annular grid elements 86 disposed, as shown, within return diffusion portion 84, are similar in structure to and perform the same function as grid elements 40 of FIG. 1, described above.

It has been found that in FIG. 2 no density control heater is required in order to maintain low noise fluctuations in the light output. This may be due to the fact that the cathode region is centrally located and is supplied with active molecules capaphoretically transported thereto from both evaporator section 68 and evaporator section 72, so that the molecule density in cathode region 64 may remain at a quite consistent sufficiently high value.

If the length of the tubes of the type shown in FIGS. 1 and 2 is extended beyond some critical length, it is no longer possible to maintain the density of the active molecules at the value necessary to maintain minimum noise unless communication between the separated regions is provided at one or more longitudinally-spaced points intermediate the anode and cathode electrodes in addition to communication in the vicinity of the anode and cathode electrodes. In this case, the vapor density is defined at regular intervals along the bore.

What is claimed is:

1. In a metal-vapor laser discharge tube responsive to a given operating voltage applied thereto for producing a discharge therein, said tube comprising a gas-filled envelope having spaced anode and cathode electrodes situated therein, wherein said gas includes as a portion thereof a given metal vapor which is cataphoretically transported from said anode to said cathode electrodes in response to a discharge in said tube; the improvement therewith of:

first means for dividing the interior of said tube between said anode and cathode electrodes into a first region of a first given length and a second region of a second given length which communicate with each other at a plurality of predetermined longitudinally - spaced points including respective first and second points in the vicinity of said respective electrodes, each of said first and second lengths being sufficiently short to permit per se respective discharges to take place in both said respective first and second regions in response to the application of said operating voltage to said anode and cathode electrodes, and second means for preventing any discharge in said second region including therein a plurality of longitudinally-distributed, separate, spaced, conductive grid elements, each of said grid elements dividing an entire cross section of said second region into a plurality of gas-diffusing openings separated from each other by conductive material, the maximum size of any of said openings being sufficiently small to prevent a discharge from passing therethrough, and the spacing between any pair of adjacent grid elements being such that the potential difference existing therebetween in response to said operating voltage being applied to said anode and cathode electrodes is below the cold-cathode breakdown voltage between that pair of adjacent grid elements, whereby in response to said operating voltage being applied to said anode and cathode electrodes a discharge takes place only in said first region and said second region acts as a return path for said cataphoretically-transported metal vapor.

2. The tube defined in claim 1, wherein the cross-sectional area of said second region is sufficiently greater than the cross-sectional area of said first region to permit the rate of diffusion of molecules of gas therethrough back from said cathode to said anode electrodes to be at all times substantially equal to the rate at which molecules of gas are cataphoretically transported through said first region between said anode and cathode electrodes.

3. The tube defined in claim 2, wherein, the cross-sectional area of said second region is in the order of one hundred times greater than the cross-sectional area of said first region.

4. The gas discharge tube defined in claim 1, wherein said gas is a mixture of helium and cadmium vapor, ions of said cadmium vapor occurring in response to a discharge being the active lasing material, said portion of said gas comprising said cadmium vapor.

5. The tube defined in claim 1, wherein said second means comprises a predetermined number of said grid elements longitudinally spaced from each other along the length of said second region, each of said elements having a significant length dimension and being configured to divide the entire volume defined by the cross-section of said second region and the length of said element into a bundle of separate gas conduits, each conduit of which extends from one end to the other end of that element, the cross-sectional area of any single gas conduit of said bundle being sufficiently smaller than either the cross-section of said second region or the length of that conduit to prevent a discharge from taking place therethrough and the spacing between said respective elements and said elements and said electrodes being close enough to prevent a discharge from taking place therebetween, the predetermined number being larger than $V_a/V_c$, where $V_a$ is the normally applied discharge voltage at which the tube operates and $V_c$ is the normal cold cathode drop which depends on the grid element material and gas in said tube.

6. The tube defined in claim 1, wherein said second means comprises a predetermined number of said grid elements longitudinally spaced from each other along the length of said second region, each of said elements having a significant length dimension, each of said elements comprising a longitudinal conductive cylinder having a conductive mesh tight enough to prevent a discharge from taking place covering at least one end of each cylinder, the cross-section of each cylinder providing a single conduit just smaller than the cross-section of said second region and the spacing between said respective elements and said elements and said electrodes being close enough to prevent a discharge from taking place therebetween, the predetermined number being larger than $V_a/V_c$, where $V_a$ is the normally applied discharge voltage at which the tube operates and $V_c$ is the normal cold cathode drop which depends on the grid element material and gas in said tube.

7. The tube defined in claim 1, wherein said first region comprises a first portion of said envelope which is disposed about a first longitudinal axis and said second region comprises a second portion of said envelope disposed about a second longitudinal axis oriented in spaced substantially parallel relationship with respect to said first axis.

8. The tube defined in claim 7, wherein said envelope further includes a third portion in the vicinity of said anode electrode which communicates with the one end of both said first and second portions of said envelope, said third portion of said envelope including an evaporator section located between said one end of said first portion and one end of said second portion and an evaporator heater in cooperative relationship therewith which heats said evaporator section for vaporizing a metal contained therein to maintain a desired density of metal vapor in said evaporator section, said vapor being cataphoretically transported from said evaporator section toward said cathode electrode through said first portion of said envelope, a fourth portion of said envelope in the vicinity of said cathode electrode which communicates with the other end of both said first and second portions of said envelope, said fourth portion including a given section thereof located between said other end of said first portion and said other end of said second portion and a density control heater in cooperative relationship therewith which heats said given section to a temperature which maintains a given density of metal vapor in said given section at which the noise level of the laser light output is substantially less than when said given section is unheated.

9. The tube defined in claim 8, wherein said temperature and given density are such as to reduce the noise level of the laser light output to less than five percent.

10. The tube defined in claim 9, wherein said metal vapor is cadmium and said temperature is about 235°.

11. The tube defined in claim 1, comprising an envelope disposed about a given longitudinal axis which extends from one end of the tube to the other end of the tube, a first anode electrode disposed toward one end of the tube, a second anode electrode disposed toward the other end of the tube, a cathode electrode disposed intermediate said first and second anode electrodes, a bore member defining a bore therethrough which is longitudinally disposed about said given axis, said bore member being disposed within said envelope in spaced relationship therewith, said bore member extending from the vicinity of said first anode to the vicinity of said second anode, said bore member having a hole therein in the vicinity of said cathode electrode to thereby permit said bore to communicate with the space of said envelope exterior to said bore member in the vicinity of said cathode electrode, whereby said bore defines said first region and the spacing between said bore member and said envelope defines said second region.

12. In a gas laser tube comprising a gas-filled envelope having spaced anode and cathode electrodes situated therein, wherein said gas includes at least a portion thereof which is a metal vapor that is cataphoretically transported from said anode toward said cathode electrodes in response to a discharge in said tube, the improvement therewith comprising an evaporator section of said envelope located between said electrodes in the vicinity of said anode electrode and an evaporator heater in cooperative relationship therewith which heats said evaporator section for vaporizing a metal contained therein to maintain a desired density of metal vapor in said evaporator section, said vapor being cataphoretically transported from said evaporator section toward said cathode electrode, and a given section of said envelope located between said electrodes in the vicinity of said cathode electrode and a density control heater in cooperative relationship therewith which heats said given section to a temperature which maintains a given density of metal vapor in said given section at which the noise level of the laser light output is substantially less than when said given section is unheated.

13. The tube defined in claim 12, wherein said temperature and given density are such as to reduce the noise level of the laser light output to less than five percent.

14. The tube defined in claim 13, wherein said metal vapor is cadmium and said temperature is about 235° C.

* * * * *